(12) United States Patent
Hu et al.

(10) Patent No.: US 11,733,806 B2
(45) Date of Patent: Aug. 22, 2023

(54) DRIVING METHOD, GATE DRIVE UNIT AND DISPLAY TOUCH DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Shuang Hu, Beijing (CN); Jingpeng Zhao, Beijing (CN); Yajie Bai, Beijing (CN); Taoliang Tang, Beijing (CN); Wentao Zhu, Beijing (CN); Hongxin Pan, Beijing (CN); Xing Dong, Beijing (CN); Rui Liu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 66 days.

(21) Appl. No.: 17/434,956

(22) PCT Filed: Nov. 26, 2020

(86) PCT No.: PCT/CN2020/131743
§ 371 (c)(1),
(2) Date: Aug. 30, 2021

(87) PCT Pub. No.: WO2022/109920
PCT Pub. Date: Jun. 2, 2022

(65) Prior Publication Data
US 2022/0253192 A1   Aug. 11, 2022

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
CPC ...... G06F 3/04184; G06F 3/0412; G09G 3/36
See application file for complete search history.

(56) References Cited

U.S. PATENT DOCUMENTS

2005/0264514 A1   12/2005   Kim et al.
2014/0015770 A1   1/2014   Lee
(Continued)

FOREIGN PATENT DOCUMENTS

CN   1705042 A   12/2005
CN   103543869 A   1/2014
(Continued)

*Primary Examiner* — Ibrahim A Khan
(74) *Attorney, Agent, or Firm* — Muncy, Geissler, Olds & Lowe, P.C.

(57) ABSTRACT

Provided are a driving method, a gate drive unit and a display touch device. The driving method is applied to the gate drive unit in the display touch device. The gate drive unit includes at least one pull-down circuit. The pull-down circuit is coupled with a pull-up node and a pull-down voltage terminal, and is configured to control connection or disconnection between the pull-up node and the pull-down voltage terminal; one frame of image display time includes a display phase and a touch phase that are alternately set, and at least one of the touch phase is set between two adjacent display phases. The driving method includes: during the touch phase, controlling, by the at least one pull-down circuit, the disconnection between the pull-up node and the pull-down voltage terminal. The problem of a screen flashing phenomenon of existing display touch devices during the touch phase is solved.

14 Claims, 6 Drawing Sheets

(56) References Cited

U.S. PATENT DOCUMENTS

| | | | |
|---|---|---|---|
| 2015/0346904 A1 | 12/2015 | Long et al. | |
| 2016/0004371 A1* | 1/2016 | Kim | G06F 3/0412 |
| | | | 345/173 |
| 2016/0224175 A1 | 8/2016 | Moon | |
| 2016/0275889 A1* | 9/2016 | Yu | G09G 3/3677 |
| 2016/0365061 A1* | 12/2016 | Hong | G09G 5/003 |
| 2016/0378232 A1 | 12/2016 | Hsu et al. | |
| 2017/0017326 A1* | 1/2017 | Wu | G09G 3/3677 |
| 2017/0102805 A1* | 4/2017 | Xiao | G06F 3/0412 |
| 2017/0124975 A1* | 5/2017 | Xiao | G09G 3/3677 |
| 2017/0199617 A1* | 7/2017 | Gu | G06F 3/04164 |
| 2017/0344179 A1* | 11/2017 | Kim | G06F 3/0443 |
| 2018/0033391 A1* | 2/2018 | So | G09G 3/3696 |
| 2018/0121023 A1* | 5/2018 | Kim | G09G 3/3677 |
| 2018/0151143 A1* | 5/2018 | Kim | G06F 3/04184 |
| 2018/0181244 A1* | 6/2018 | Sato | G09G 3/3677 |
| 2018/0190364 A1 | 7/2018 | Gu et al. | |
| 2018/0196563 A1 | 7/2018 | Iwase et al. | |
| 2018/0246614 A1* | 8/2018 | Hu | G09G 3/3258 |
| 2018/0275804 A1* | 9/2018 | Huang | G06F 3/04184 |
| 2018/0366047 A1* | 12/2018 | Sang | G06F 3/0412 |
| 2019/0080658 A1 | 3/2019 | Yamamoto et al. | |
| 2019/0114013 A1* | 4/2019 | Wu | G06F 3/04166 |
| 2019/0114980 A1* | 4/2019 | Kim | G06F 3/044 |
| 2019/0129547 A1* | 5/2019 | Dai | G06F 3/04184 |
| 2019/0129562 A1* | 5/2019 | Li | G09G 3/3677 |
| 2019/0139508 A1* | 5/2019 | Park | G09G 3/20 |
| 2019/0155433 A1* | 5/2019 | Park | G06F 3/04184 |
| 2019/0180708 A1* | 6/2019 | Hong | G06F 3/0412 |
| 2020/0168284 A1* | 5/2020 | Yu | G06F 3/0412 |
| 2020/0372873 A1* | 11/2020 | Huang | G09G 3/3677 |
| 2021/0335305 A1 | 10/2021 | Mi et al. | |
| 2022/0130306 A1* | 4/2022 | Zhou | G09G 3/3266 |

FOREIGN PATENT DOCUMENTS

| | | |
|---|---|---|
| CN | 103996370 A | 8/2014 |
| CN | 105845065 A | 8/2016 |
| CN | 106531052 A | 3/2017 |
| CN | 107452425 A | 12/2017 |
| CN | 107665060 A | 2/2018 |
| CN | 108319385 A | 7/2018 |
| CN | 109491533 A | 3/2019 |
| CN | 109710113 A | 5/2019 |
| CN | 109859670 A | 6/2019 |
| CN | 107452425 B | 2/2021 |
| KR | 20150073466 A | 7/2015 |
| KR | 20160058278 A | 5/2016 |
| WO | WO-2017006815 A1 | 1/2017 |

* cited by examiner

DRIVING METHOD, GATE DRIVE UNIT AND DISPLAY TOUCH DEVICE

CROSS-REFERENCE TO RELATED APPLICATION

This application is the U.S. national phase of PCT Application No. PCT/CN2020/131743 filed on Nov. 26, 2020, the disclosure of which is incorporated in its entirety by reference herein.

TECHNICAL FIELD

The present disclosure relates to the field of display touch technologies, and in particular to a driving method, a gate drive unit and a display touch device.

BACKGROUND

At present, In Cell (in-cell) touch technology adopts a mode in which touch scanning is inserted into one frame of image display time to increase the frequency of touch scanning. In this mode, within one frame of image display time, display scanning and touch scanning are performed alternately. During one frame of image display time, after display scanning is performed on a fixed row of gate lines, it is necessary to enter the touch time to perform touch scanning, then the display scanning is further performed on a fixed row of gate lines, then the touch scanning is continued, and the display scanning and touch scanning are performed alternately, until the end of one frame of image display time, and the entire display screen has been scanned. Existing display touch devices may have a bad phenomenon of flickering screen due to the fact that a potential of a pull-up node cannot be maintained at a high voltage during a touch phase.

SUMMARY

Embodiments of the present disclosure provide a driving method, a gate drive unit, and a display touch device, so as to solve a problem of a screen flickering phenomenon of existing display touch devices during a touch phase.

In a first aspect, at least one embodiment of the present disclosure provides a driving method applied to a gate drive unit in a display touch device. The gate drive unit includes at least one pull-down circuit; the at least one pull-down circuit is coupled with a pull-up node and a pull-down voltage terminal, and is configured to control connection or disconnection between the pull-up node and the pull-down voltage terminal; one frame of image display time includes a display phase and a touch phase that are alternately set, and at least one of the touch phase is set between two adjacent display phases. The driving method includes: during the touch phase, controlling, by the at least one pull-down circuit, the disconnection between the pull-up node and the pull-down voltage terminal.

Optionally, the at least one pull-down circuit is configured to control a duration of the disconnection between the pull-up node and the pull-down voltage terminal to be greater than or equal to a duration of the touch phase.

Optionally, the gate drive unit includes one pull-down node and one pull-down circuit; the pull-down circuit includes a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal; and the driving method includes: controlling, during the touch phase, the pull-down transistor to be turned off by controlling a potential of the pull-down node, where a turn-off duration of the pull-down transistor is greater than or equal to a duration of the touch phase.

Optionally, the gate drive unit further includes a voltage control terminal and a pull-down control circuit; the pull-down control circuit is electrically coupled with the voltage control terminal, the pull-up node and the pull-down node, and is configured to control the potential of the pull-down node according to a voltage control signal provided at the voltage control terminal and a potential of the pull-up node; and the driving method includes: during the touch phase, and controlling a potential of the voltage control signal to be an ineffective voltage, so that the pull-down control circuit controls the potential of the pull-down node, and the pull-down transistor is turned off.

Optionally, the driving method further includes: controlling the potential of the voltage control signal provided at the voltage control terminal to be an effective voltage, when the display touch device operates in the display phase.

Optionally, the gate drive unit includes a first pull-down node, a second pull-down node, a first pull-down circuit, and a second pull-down circuit; the first pull-down circuit includes a first pull-down transistor, and the second pull-down circuit includes a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal. The driving method includes: controlling, during the touch phase, the first pull-down transistor and the second pull-down transistor to be turned off by controlling a potential of the first pull-down node and a potential of the second pull-down node, where a turned-off duration of the first pull-down transistor is greater than a duration of the touch phase, and a turn-off duration of the second pull-down transistor is greater than or equal to the duration of the touch phase.

Optionally, the gate drive unit further includes a first voltage control terminal, a second voltage control terminal, and a pull-down control circuit; the pull-down control circuit is electrically coupled with the first voltage control terminal, the second voltage control terminal, the pull-up node, the first pull-down node, and the second pull-down node, and is configured to control the potential of the first pull-down node based on a first voltage control signal supplied to the first voltage control terminal and the potential of the pull-up node, and control the potential of the second pull-down node based on a second voltage control signal supplied to the second voltage control terminal and the potential of the pull-up node. The driving method includes:

during the touch phase, controlling the potential of the first voltage control signal supplied to the first voltage control terminal to be an ineffective voltage, and controlling the potential of the first pull-down node by the pull-down control circuit, to enable the pull-down transistor to be turned off; and during the touch phase, controlling the potential of the second voltage control signal supplied to the second voltage control terminal to be an ineffective voltage, and controlling the potential of the second pull-down node by the pull-down control circuit, to enable the second pull-down transistor to be turned off.

Optionally, an operating cycle of the display touch device includes a plurality of switching periods, each of the switching periods includes a first switching time period and a second switching time period, and the driving method further includes:

when the display touch device operates in the display phase during the first switching time period, controlling the potential of the first voltage control signal to be an effective voltage, and controlling the potential of the second voltage control signal to be an ineffective voltage; and when the display touch device operates in the display phase during the second switching time period, controlling the potential of the second voltage control signal to be an effective voltage, and controlling the potential of the first voltage control signal to be an ineffective voltage.

Optionally, each of a duration of the first switching time period and a duration of the second switching time period is one frame of image display time; or, each of a duration of the first switching time period and a duration of the second switching time period is greater than or equal to N frames of image display time; N is an integer greater than or equal to 1.

In a second aspect, a gate drive unit is further provided according to at least one embodiments of the present disclosure, which includes at least one pull-down circuit. The at least one pull-down circuit is coupled with a pull-up node and a pull-down voltage terminal, and is configured to control connection or disconnection between the pull-up node and the pull-down voltage terminal; one frame of image display time includes a display phase and a touch phase that are alternately set, and at least one of the touch phase is set between two adjacent display phases; the pull-down circuit is configured to control the disconnection between the pull-up node and the pull-down voltage terminal.

In a third aspect, a display touch device is further provided according to at least one embodiments of the present disclosure, which includes a gate drive circuit, where the gate drive circuit includes a plurality of stages of the gate drive units, each of which is as described above.

Optionally, the gate drive unit includes a pull-down control circuit, a pull-down node, a pull-down circuit, and a voltage control terminal; the display control device further includes a signal supply unit;

the pull-down circuit includes a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal;

the pull-down control circuit is electrically coupled with the voltage control terminal, the pull-up node, and the pull-down node, and is configured to control a potential of the pull-down node according to a voltage control signal provided at the voltage control terminal and a potential of the pull-up node; and the signal supply unit is configured to control a potential of the voltage control signal to an ineffective voltage during the touch phase, so that the pull-down control circuit controls the potential of the pull-down node, and the pull-down transistor is controlled to be turned off.

Optionally, the gate drive unit includes a first pull-down node, a second pull-down node, a first pull-down circuit, and a second pull-down circuit; the first pull-down circuit includes a first pull-down transistor, and the second pull-down circuit includes a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal;

the gate drive unit further includes a first voltage control terminal, a second voltage control terminal, and a pull-down control circuit; the pull-down control circuit is electrically coupled with the first voltage control terminal, the second voltage control terminal, the pull-up node, the first pull-down node, and the second pull-down node, and is configured to control the potential of the first pull-down node based on a first voltage control signal supplied to the first voltage control terminal and the potential of the pull-up node, and control the potential of the second pull-down node based on a second voltage control signal supplied to the second voltage control terminal and the potential of the pull-up node;

the signal supply unit is configured to:

during the touch phase, control the potential of the first voltage control signal supplied to the first voltage control terminal to be an ineffective voltage, and control the potential of the first pull-down node by the pull-down control circuit, to enable the pull-down transistor to be turned off; and during the touch phase, control the potential of the second voltage control signal supplied to the second voltage control terminal to be an ineffective voltage, control the potential of the second pull-down node by the pull-down control circuit, to enable the second pull-down transistor to be turned off.

Optionally, an operating cycle of the display touch device includes a plurality of switching periods, each of the switching periods includes a first switching time period and a second switching time period, and the signal supply unit is further configured to: when the display touch device operates in the display phase during the first switching time period, control the potential of the first voltage control signal to be an effective voltage, and control the potential of the second voltage control signal to be an ineffective voltage; and when the display touch device operates in the display phase during the second switching time period, control the potential of the second voltage control signal to be an effective voltage, and control the potential of the first voltage control signal to be an ineffective voltage.

DETAILED DESCRIPTION

Figure 1:
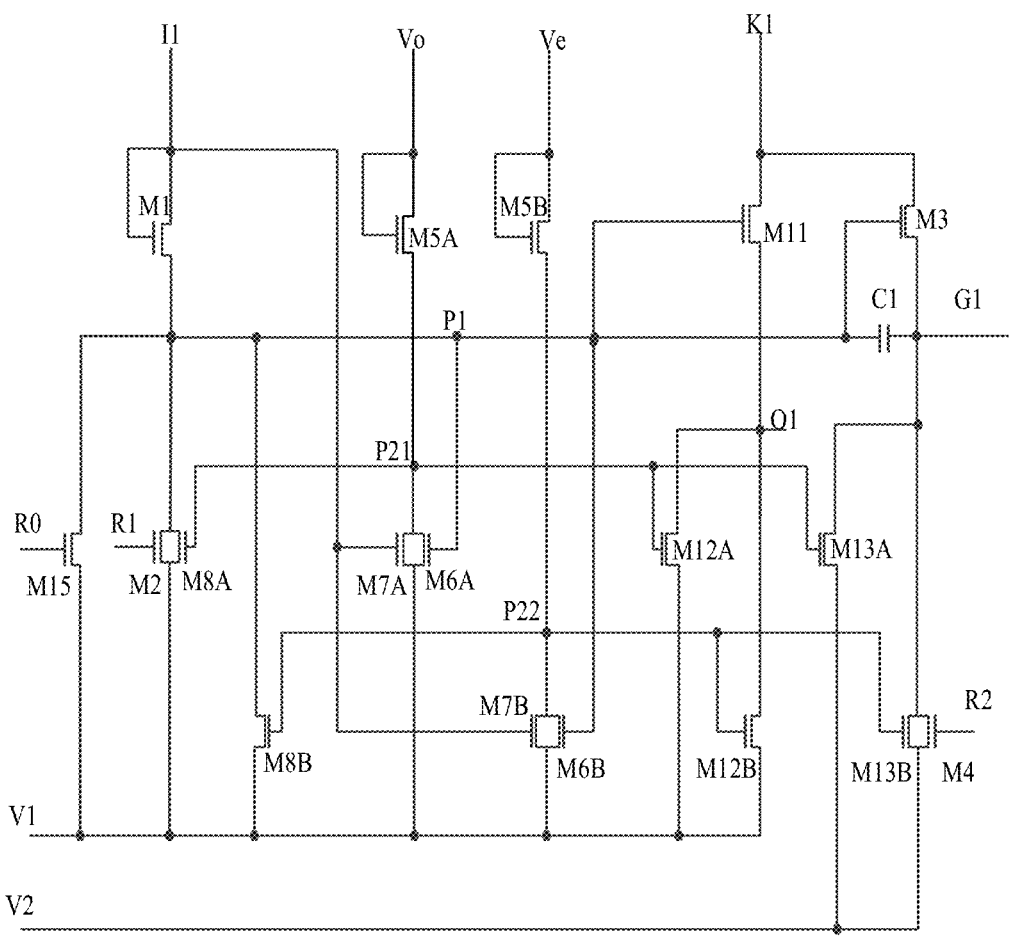
FIG. 1 is a circuit diagram of a gate drive unit in a display touch device according to at least one embodiment of the present disclosure.

Technical solutions in embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative effort shall fall within the protection scope of the present disclosure.

The transistors used in at least one embodiment of the present disclosure may be triodes, thin film transistors, field effect transistors, or other components with the same characteristic. In at least one embodiment of the present disclosure, in order to distinguish the two electrodes of the transistor other than the control electrode, one of the electrodes is called a first electrode, and the other electrode is called the second electrode.

In actual operation, when a transistor is a triode, the control electrode may be a base electrode, the first electrode may be a collector electrode, and the second electrode may be an emitter electrode; or, the control electrode may be a base electrode, the first electrode may be an emitter electrode, and the second electrode may be a collector electrode.

In actual operation, when a transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

A driving method is provided in at least one embodiment of the present disclosure, which is applied to a gate drive unit in a display touch device. The gate drive unit includes at least one pull-down circuit. The pull-down circuit is coupled with a pull-up node and a pull-down voltage terminal, and is configured to control connection or disconnection between the pull-up node and the pull-down voltage terminal. A frame of image display time includes a display phase and a touch phase that are alternately set, and at least one touch phase is set between two adjacent display phases. The driving method includes: during the touch phases, controlling, by the at least one pull-down circuit, the disconnection between the pull-up node and the pull-down voltage terminal.

In at least one embodiment of the present disclosure, the pull-down voltage terminal may be a low-voltage terminal, but is not limited to this.

In the driving method described in the at least one embodiment of the present disclosure, during a touch phase, a pull-down circuit controls the path between the pull-up node and the pull-down voltage terminal to be disconnected, so that when the display touch device operates in the touch phase, a potential of the pull-up node may not be pulled down due to leakage, and the potential of the pull-up node may be maintained well. Thus, during a display phase after the touch phase, an output transistor controlled by the pull-up node (a first electrode of the output transistor is electrically coupled with a clock signal output terminal, and a second electrode of the output transistor is electrically coupled with a gate drive signal output terminal) may be correctly turned on. Since the output transistor can be controlled to be correctly turned on during the display phase, the screen flickering phenomenon is improved.

Optionally, the pull-down circuit is configured to control a duration of the disconnection between the pull-up node and the pull-down voltage terminal to be greater than or equal to a duration of the touch phase. That is, the pull-down circuit controls the disconnection between the pull-up node and the pull-down voltage terminal at least during the touch phase, so that the potential of the pull-up node can be well maintained during the touch phase.

In specific implementation, the gate drive unit may include a pull-down node and a pull-down circuit; a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal. The driving method includes: controlling, during the touch phase, the pull-down transistor to be turned off by controlling a potential of the pull-down node, so that the path between the pull-up node and the pull-down voltage terminal is disconnected, where a turn-off duration of the pull-down transistor is greater than or equal to a duration of the touch phase.

In at least one embodiment of the present disclosure, when the gate drive unit includes a pull-down node and a pull-down circuit, the gate drive unit further includes a voltage control terminal and a pull-down control circuit; the pull-down control circuit is electrically coupled with the voltage control terminal, the pull-up node and the pull-down node, and is configured to control the potential of the pull-down node according to a voltage control signal provided at the voltage control terminal and a potential of the pull-up node; and the driving method includes: during the touch phase, controlling a potential of the voltage control signal to be an ineffective voltage, and controlling the potential of the pull-down node by the pull-down control circuit, to enable the pull-down transistor to be turned off.

When a transistor included in the pull-down control circuit whose control electrode is coupled with the voltage control signal is an n-type transistor, the ineffective voltage is a low voltage to enable the transistor to be turned off; when a transistor included in the pull-down control circuit whose control electrode is coupled with the voltage control signal is a p-type transistor, the ineffective voltage is a high voltage to enable the transistor to be turned off.

Specifically, the driving method according to at least one embodiment of the present disclosure may further include: controlling the potential of the voltage control signal provided at the voltage control terminal to be an effective voltage, when the display touch device operates in the display phase.

When a transistor included in the pull-down control circuit whose control electrode is coupled with the voltage control signal is an n-type transistor, the effective voltage is a high voltage to enable the transistor to be turned on; when a transistor included in the pull-down control circuit whose control electrode is coupled with the voltage control signal is a p-type transistor, the effective voltage is a low voltage to enable the transistor to be turned on.

Optionally, the gate drive unit includes a first pull-down node, a second pull-down node, a first pull-down circuit, and a second pull-down circuit; the first pull-down circuit includes a first pull-down transistor, and the second pull-down circuit includes a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal. The driving method includes: controlling, during the touch phase, the first pull-down transistor and the second pull-down transistor to be turned off by controlling a potential of the first pull-down node and a potential of the second pull-down node, where a turned-off duration of the first pull-down transistor is greater than a duration of the touch phase, and a turn-off duration of the second pull-down transistor is greater than or equal to the duration of the touch phase.

In at least one embodiment of the present disclosure, when the gate drive unit includes a first pull-down node, a second pull-down node, a first pull-down circuit, and a second pull-down circuit, the gate drive unit further includes a first voltage control terminal, a second voltage control terminal, and a pull-down control circuit; the pull-down control circuit is electrically coupled with the first voltage control terminal, the second voltage control terminal, the pull-up node, the first pull-down node, and the second pull-down node, and is configured to control the potential of the first pull-down node based on a first voltage control signal provided by the first voltage control terminal and the potential of the pull-up node, and control the potential of the second pull-down node based on a second voltage control signal provided by the second voltage control terminal and the potential of the pull-up node; and the driving method includes:

during the touch phase, controlling the potential of the first voltage control signal supplied to the first voltage control terminal to be an ineffective voltage, and controlling the potential of the first pull-down node by the pull-down control circuit, to enable the pull-down transistor to be turned off; and during the touch phase, controlling the potential of the second voltage control signal supplied to the second voltage control terminal to be an ineffective voltage, and controlling the potential of the second pull-down node by the pull-down control circuit, to enable the second pull-down transistor to be turned off.

When a transistor included in the pull-down control circuit whose control electrode is coupled with the first voltage control signal and the second voltage control signal is an n-type transistor, the ineffective voltage is a low voltage to enable the transistor to be turned off. When a transistor included in the pull-down control circuit whose control electrode is coupled with the first voltage control signal and the second voltage control signal is a p-type transistor, the ineffective voltage is a high voltage to enable the transistor to be turned off.

Optionally, the gate drive unit may include a first voltage control terminal and a second voltage control terminal; an operating cycle of the display touch device includes a plurality of switching periods, each of the switching periods includes a first switching time period and a second switching time period, and the driving method further includes:

when the display touch device operates in the display phase during the first switching time period, controlling the potential of the first voltage control signal to be an effective voltage, and controlling the potential of the second voltage control signal to be an ineffective voltage; and when the display touch device operates in the display phase during the second switching time period, controlling the potential of the second voltage control signal to be an effective voltage, and controlling the potential of the first voltage control signal to be an ineffective voltage.

In specific implementation, the gate drive unit may include two voltage control terminals: a first voltage control terminal and a second voltage control terminal; and the switching period includes a first switching time period and a second switching time period. The gate drive unit is provided with a first pull-down node and a second pull-down node. In the display phase during the first switching time period, the potential of the first voltage control signal is an effective voltage, and in the display phase during the second switching time period, the potential of the second voltage control signal is an effective voltage. By using the first voltage control signal and the second voltage control signal, and designing the first voltage control signal and the second voltage control signal to be effective in different times or divided times, the potential of the pull-down node and the potential of the second pull-down node can be made time-sharing effective.

In at least one embodiment of the present disclosure, the switching period includes a first switching time period and a second switching time period set in sequence; or, the switching period includes a second switching time period and a first switching time period set in sequence, which is not limited thereto.

In at least one embodiment of the present disclosure, each of a duration of the first switching time period and a duration of the second switching time period is one frame of image display time; or, each of a duration of the first switching time period and a duration of the second switching time period is greater than or equal to N frames of image display time; N is an integer greater than or equal to 1.

Optionally, the duration of the first switching time period and the duration of the second switching time period may be one frame of image display time, so that the duration of the first switching time period and the duration of the second switching time period are relatively short. Therefore, a threshold voltage drift phenomenon of a transistor whose control electrode is coupled with the voltage control signal is improved, and a threshold voltage drift phenomenon of a transistor whose control electrode is electrically coupled with the pull-down node is improved.

Optionally, the duration of the first switching time period may be greater than or equal to N frames of image display time, and the duration of the second switching time period may be greater than or equal to N frames of image display time. For example, the duration of the first switching time period may be, for example, 2 frames of image display time, 3 frames of image display time, 4 frames of image display time, 5 frames of image display time, 1 s (second) or 2 s (seconds), which is not limited thereto.

FIG. 1 is a circuit diagram of a gate drive unit in a display touch device according to at least one embodiment of the present disclosure.

As shown in FIG. 1, the gate drive unit according to at least one embodiment includes a first pull-down circuit, a second pull-down circuit, a pull-down control circuit, a first voltage control terminal Vo, a second voltage control terminal Ve, a first pull-down node P21, a second pull-down node P22, a pull-up node control circuit, a pull-down node control circuit, a gate drive signal output circuit, and a carry signal output circuit.

The pull-down control circuit may include a first pull-down control transistor M5A, a second pull-down control transistor M6A, a third pull-down control transistor M5B, and a fourth pull-down control transistor M6B.

A gate electrode of M5A and a drain electrode of M5A are both electrically coupled with the first voltage control terminal Vo, and a source electrode of M5A is electrically coupled with the first pull-down node P21.

A gate electrode of M6A is electrically coupled with a pull-up node P1, a drain electrode of M6A is electrically coupled with the first pull-down node P21, and a source electrode of M6A is electrically coupled with a first low-voltage terminal; the first low-voltage terminal is used to provide a first low voltage V1.

A gate electrode of M5B and a drain electrode of M5B are both electrically coupled with the second voltage control terminal Ve, and a source electrode of M5B is electrically coupled with the second pull-down node P22.

A gate electrode of M6B is electrically coupled with the pull-up node P1, a drain electrode of M6B is electrically coupled with the second pull-down node P22, and a source electrode of M6B is electrically coupled with the first low-voltage terminal.

The pull-down node control circuit includes a first pull-down node control transistor M7A and a second pull-down node control transistor M7B.

A gate electrode of M7A is electrically coupled with an input terminal I1, a drain electrode of M7A is electrically coupled with the first pull-down node P21, and a source electrode of M7A is electrically coupled with the first low-voltage terminal.

A gate electrode of M7B is electrically coupled with the input terminal a drain electrode of M7B is electrically coupled with the second pull-down node P22, and a source electrode of M7B is electrically coupled with the first low-voltage terminal.

The first pull-down circuit includes a first pull-down transistor M8A, and the second pull-down circuit includes a second pull-down transistor M8B; the pull-up node control circuit includes an input transistor M1, a reset transistor M2, and a frame reset transistor M15.

Both a gate electrode of M1 and a drain electrode of M1 are electrically coupled with the input terminal I1, and a source electrode of M1 is electrically coupled with the pull-up node P1.

A gate electrode of M2 is electrically coupled with a first reset terminal R1, a drain electrode of M2 is electrically coupled with the pull-up node P1, and a source electrode of M2 is electrically coupled with the first low-voltage terminal.

A gate electrode of M8A is electrically coupled with the first pull-down node P21, a drain electrode of M8A is electrically coupled with the pull-up node P1, and a source electrode of M8A is electrically coupled with the first low-voltage terminal.

A gate electrode of M8B is electrically coupled with the second pull-down node P22, a drain electrode of M8B is electrically coupled with the pull-up node P1, and a source electrode of M8B is electrically coupled with the first low-voltage terminal.

A gate electrode of M15 is electrically coupled with a frame reset terminal R0, a drain electrode of M15 is electrically coupled with the pull-up node P1, and a source electrode of M15 is electrically coupled with the first low-voltage terminal.

The carry signal output circuit includes a first carry output transistor M11, a second carry output transistor M12A, and a third carry output transistor M12B.

The gate drive signal output circuit includes a first gate drive output transistor M3, a second gate drive output transistor M13A, a third gate drive output transistor M13B, a fourth gate drive output transistor M4 and an output capacitor C1.

A gate electrode of M11 is electrically coupled with the pull-up node P1, a drain electrode of M11 is electrically coupled with a clock signal output terminal k1, and a source electrode of M11 is electrically coupled with a carry signal output terminal O1.

A gate electrode of M12A is electrically coupled with the first pull-down node P21, a drain electrode of M12A is electrically coupled with the carry signal output terminal O1, and a source electrode of M12A is electrically coupled with the first low-voltage terminal.

A gate electrode of M12B is electrically coupled with the second pull-down node P22, a drain electrode of M12B is electrically coupled with the carry signal output terminal O1, and a source electrode of M12B is electrically coupled with the first low-voltage terminal.

A gate electrode of M3 is electrically coupled with the pull-up node P1, a drain electrode of M3 is electrically coupled with the clock signal output terminal k1, and a source electrode of M3 is electrically coupled with a gate drive signal output terminal G1.

A gate electrode of M13A is electrically coupled with the first pull-down node P21, a drain electrode of M13A is electrically coupled with the gate drive signal output terminal G1, and a source electrode of M13A is electrically coupled with a second low-voltage terminal, which is used to provide a second low voltage V2.

A gate electrode of M13B is electrically coupled with the second pull-down node P22, a drain electrode of M13B is electrically coupled with the gate drive signal output terminal G1, and a source electrode of M13B is electrically coupled with the second low-voltage terminal.

A gate electrode of M4 is electrically coupled with a second reset terminal R2, a drain electrode of M4 is electrically coupled with the gate drive signal output terminal G1, and a source electrode of M4 is electrically coupled with the second low-voltage terminal.

A first end of C1 is electrically coupled with the pull-up node P1, and a second end of C1 is electrically coupled with the gate drive signal output terminal G1.

In at least one embodiment shown in FIG. 1, the pull-down voltage terminal is the first low-voltage terminal, which is not limited to this.

In at least one embodiment shown in FIG. 1, all the transistors are NMOS transistors (N-type metal-oxide-semiconductor transistors), for example, the metal-oxide is IGZO (Indium Gallium Zinc Oxide), which is not limited to this.

The gate drive unit shown in FIG. 1 according to at least one embodiment of the present disclosure may be a gate drive unit adopted in a Full in cell Oxide touch display screen.

During working, the Full in cell Oxide touch screen can use an LHB (Long Horizon Blanking) touch scan mode (the LHB touch scan mode refers to a mode in which the touch scan time is inserted into one frame of image display time). For example, one frame of image display time may include 16 display phases, and 16 touch phases may be inserted into the display time of one frame. In each display phase, 72 rows of gate lines are scanned. After every 72 rows of pixel circuits are displayed, the touch phase of 480 us enters. In each touch phase, an output clock signal provided at the clock signal output terminal K1 is a low voltage signal, so every 73 to 76 rows of gate line scan time, a potential of the pull-up node P1 should be maintained at a high voltage of at least 480us until a high voltage signal provided by K1 is inputted, so that an normal output of the gate drive circuit including multiple stages of gate drive units can be ensured.

In at least one embodiment of the present disclosure, a blanking area is also provided between two adjacent frames of image display time. In a preferred case, a voltage control signal is switched in the blank area. Therefore, a switching period of the voltage control signal is related to a display refresh rate. For example, when the display refresh rate is 60 Hz, the image display time of one frame lasts about 16.7 ms, and the voltage control signal is switched every M×16.7 ms; when the display refresh rate is 120 Hz, the image display time of one frame lasts about 8.3 ms, and the voltage control signal is switched every M×8.3 ms, M being a positive integer.

In at least one embodiment of the present disclosure, the switching the voltage control signal refers to: controlling the potential of the first voltage control signal to jump from a high voltage to a low voltage, and controlling the potential of the second voltage control signal to jump from a low voltage to a high voltage; or, controlling the potential of the first voltage control signal to jump from a low voltage to a high voltage, and controlling the potential of the second voltage control signal to jump from a high voltage to a low voltage.

In at least one embodiment of the present disclosure, by switching the voltage control signal, the threshold voltage drift phenomenon of the transistor whose control electrode is coupled with the voltage control signal, and the threshold voltage drift phenomenon of the transistor whose control electrode is electrically coupled with the pull-down node can be alleviated.

In the related art, inventors found that every 2 s (seconds), the first voltage control signal provided by Vo jumps from a high voltage signal to a low voltage signal, and the second voltage control signal provided by Ve jumps from a low voltage signal to a high voltage signal; or, the first voltage control signal provided by Vo jumps from a low voltage signal to a high voltage signal, and the second voltage control signal provided by Ve jumps from a high voltage signal to a low voltage signal, and each time high and low voltages of the voltage control signal are switched, the charging capacity of the pull-up node P1 will be insufficient. The macroscopic performance is that an image displayed on a display panel may flicker once every 2 s, and this defect is the LHB screen flickering defect. Based on this, at least one embodiment of the present disclosure adopts a driving method, to provide a voltage control signal to a voltage control terminal of a gate drive unit in a display touch device, and to alleviate or improve the LHB screen flickering phenomenon by synchronizing the voltage control signal with a synchronization signal S0.

Figure 2:
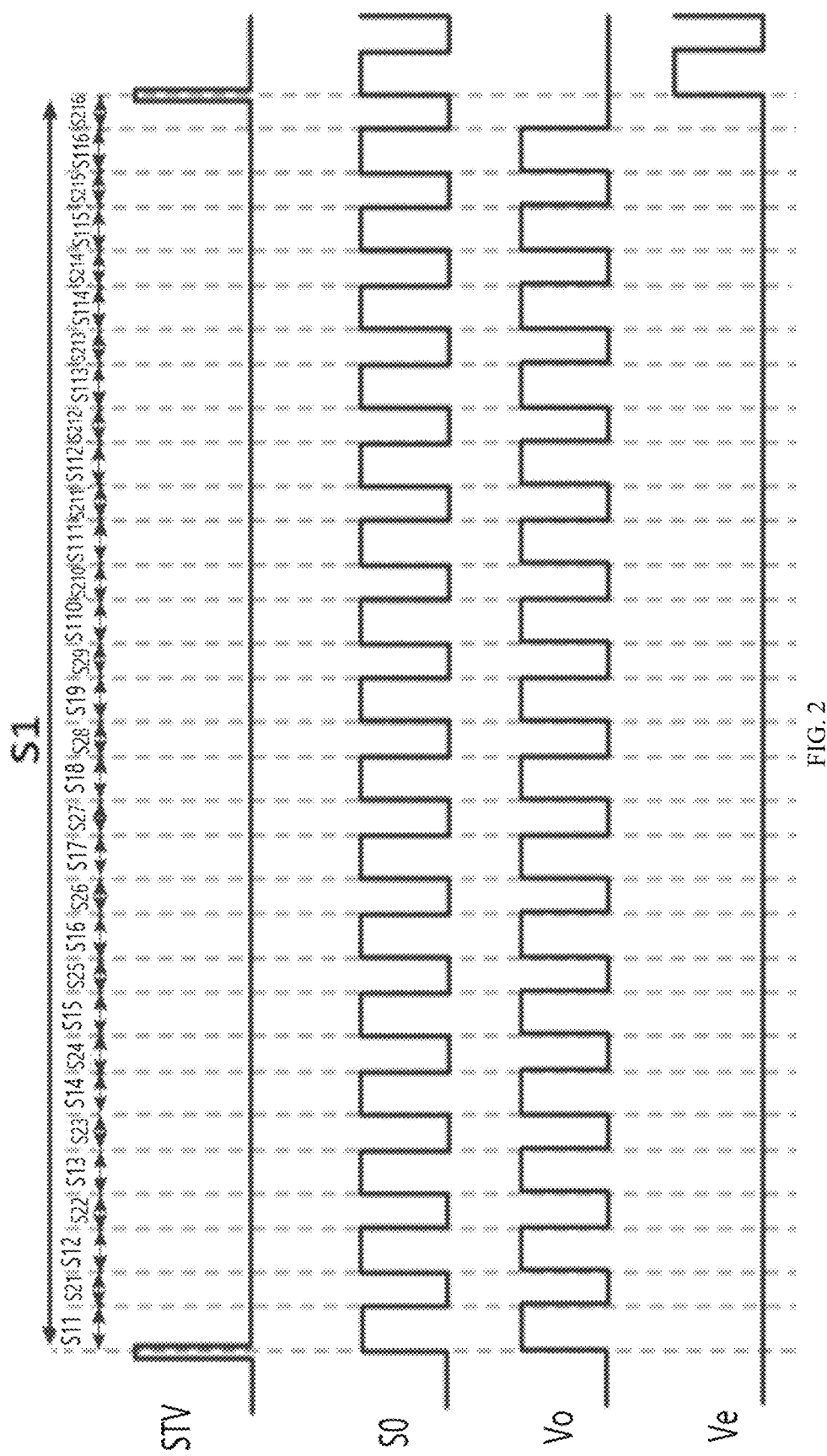
FIG. 2 is a working timing diagram of the gate drive unit during a first frame of image display time according to at least one embodiment.

As shown in FIG. 2, a first frame of image display time includes a first display phase S11, a first touch phase S21, a second display phase S12, a second touch phase S22, a third display phase S13, a third display phase S23, a fourth display phase S14, a fourth touch phase S24, a fifth display phase S15, a fifth touch phase S25, a sixth display phase S16, a sixth touch phase S26, a seventh display phase S17, a seventh touch phase S27, an eighth display phase S18, an eighth touch phase S28, a ninth display phase S19, a ninth touch phase S29, a tenth display phase S110, a tenth touch phase S210, an eleventh display phase S111, an eleventh touch phase S211, a twelfth display phase S112, a twelfth touch phase S212, a thirteenth display phase S113, a thirteenth touch phase S213, a fourteenth display phase S114, a fourteenth touch phase S214, a fifteenth display phase S115, a fifteenth touch phase S215, a sixteenth display phase S116, and a sixteenth touch phase S216.

In S11, S12, S13, S14, S15, S16, S17, S18, S19, S110, S111, S112, S113, S114, S115 and S116, each of S0 and the first voltage control signal provided by Vo is a high voltage, and the second voltage control signal provided by Ve is a low voltage.

In S21, S22, S23, S24, S25, S26, S27, S28, S29, S210, S211, S212, S213, S214, S215 and S216, all of S0, the first voltage control signal and the second voltage control signal are low voltages.

Figure 3:
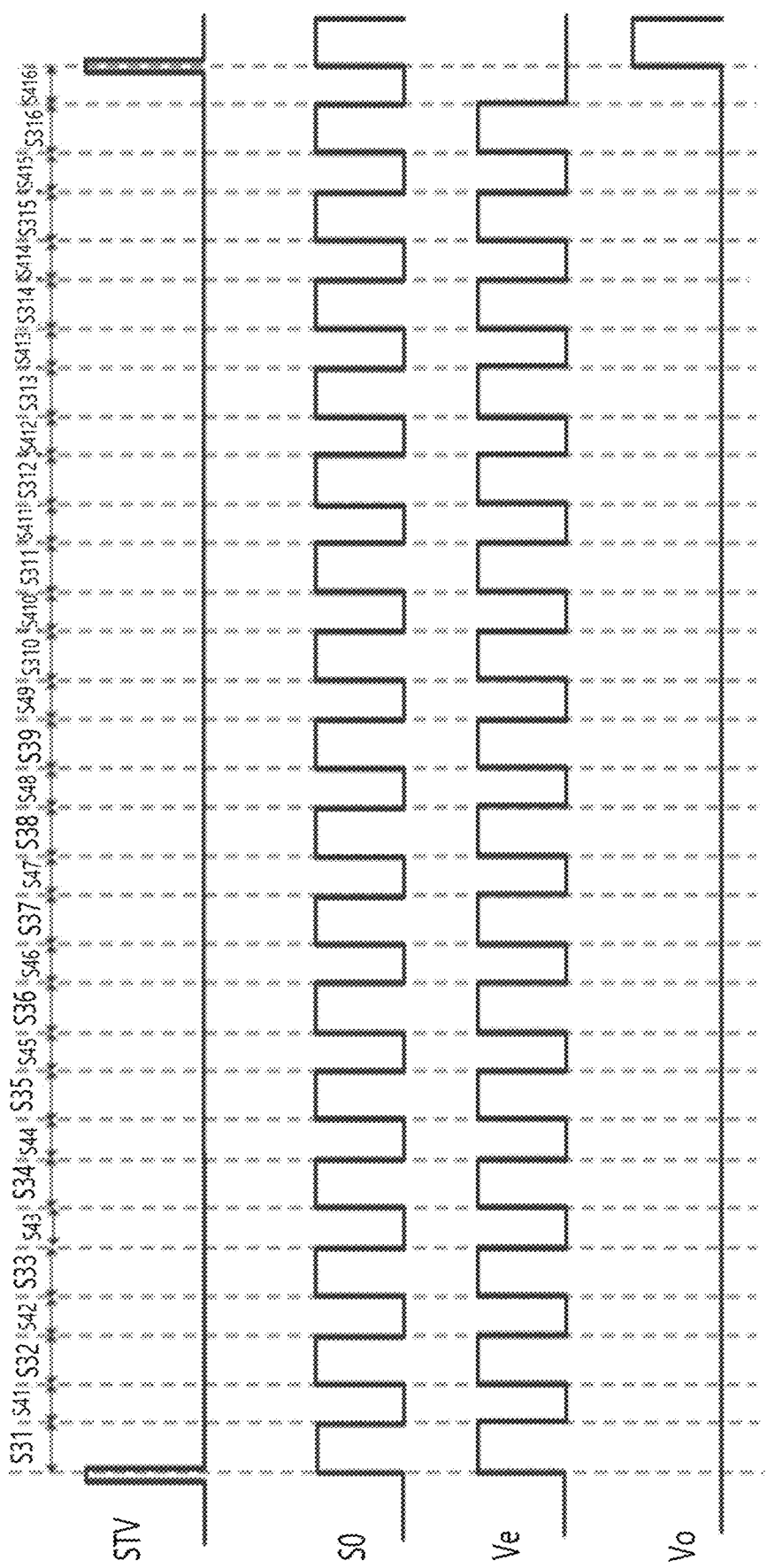
FIG. 3 is a working timing diagram of the gate drive unit during a second frame of image display time according to at least one embodiment.

As shown in FIG. 3, the first display phase included in a second frame of image display time is labeled S31, the first touch phase included in the second frame of image display time is labeled S41, the second display phase included in the second frame of image display time is labeled S32, the second touch phase included in the second frame of image display time is labeled S42; the third display phase included in the second frame of image display time is labeled S33, the third touch phase included in the second frame of image display time is labeled S43, the fourth display phase included in the second frame of image display time is labeled S34, the fourth touch phase included in the second frame of image display time is labeled S44; the fifth display phase included in the second frame of image display time is labeled S35, the fifth touch phase included in the second frame of image display time is labeled S45; the sixth display phase included in the second frame of image display time is labeled S36, the sixth touch phase included in the second frame of image display time is labeled S46; the seventh display phase included in the second frame of image display time is labeled S37, the seventh touch phase included in the second frame of image display time is labeled S47; the eighth display phase included in the second frame of image display time is labeled S38, the eighth touch phase included in the second frame of image display time is labeled S48; the ninth display phase included in the second frame of image display time is labeled S39, the ninth touch phase included in the second frame of image display time is labeled S49; the tenth display phase included in the second frame of image display time is labeled S310, the tenth touch phase included in the second frame of image display time is labeled S410; the eleventh display phase included in the second frame of image display time is labeled S311, the eleventh touch phase included in the second frame of image display time is labeled S411; the twelfth display phase included in the second frame of image display time is labeled S312, the twelfth touch phase included in the second frame of image display time is labeled S412; the thirteenth display phase included in the second frame of image display time is labeled S313, the thirteenth touch phase included in the second frame of image display time is labeled S413; the fourteenth display phase included in the second frame of image display time is labeled S314, the fourteenth touch phase included in the second frame of image display time is labeled S414; the fifteenth display phase included in the second frame of image display time is labeled S315, the fifteenth touch phase included in the second frame of image display time is labeled S415; the sixteenth display phase included in the second frame of image display time is labeled S316, and the sixteenth touch phase included in the second frame of image display time is labeled S416.

As shown in FIG. 3, S31, S41, S32, S42, S33, S43, S34, S44, S35, S45, S36, S46, S37, S47, S38, S48, S39, S49, S310, S410, S311, S411, S312, S412, S313, S413, S314, S414, S315, S415, S316 and S416 are set in sequence.

In S31, S32, S33, S34, S35, S36, S37, S38, S39, S310, S311, S312, S313, S314, S315 and S316, each of S0 and the second voltage control signal provided by Ve is a high voltage, and the first voltage control signal provided by Vo is a low voltage.

In S41, S42, S43, S44, S45, S46, S47, S48, S49, S410, S411, S412, S413, S414, S415 and S416, all of S0, the first voltage control signal and the second voltage control signal are low voltages.

In FIG. 3, STV is a frame start signal, and an input terminal of a first-stage gate drive unit included in the gate drive circuit is coupled with the frame start signal STV.

Through the frame frequency switching design of the first voltage control signal provided by Vo and the second voltage control signal provided by Ve, M8A and M8B are under high voltage bias in a shorter time interval, so that the leakage current of the pull-up node P1 becomes smaller, so that the potential of P1 can maintain a high voltage for a long enough time, and the high voltage maintenance time of P1 may be close to 600 us, thus the screen flickering phenomenon disappears.

Figure 4:
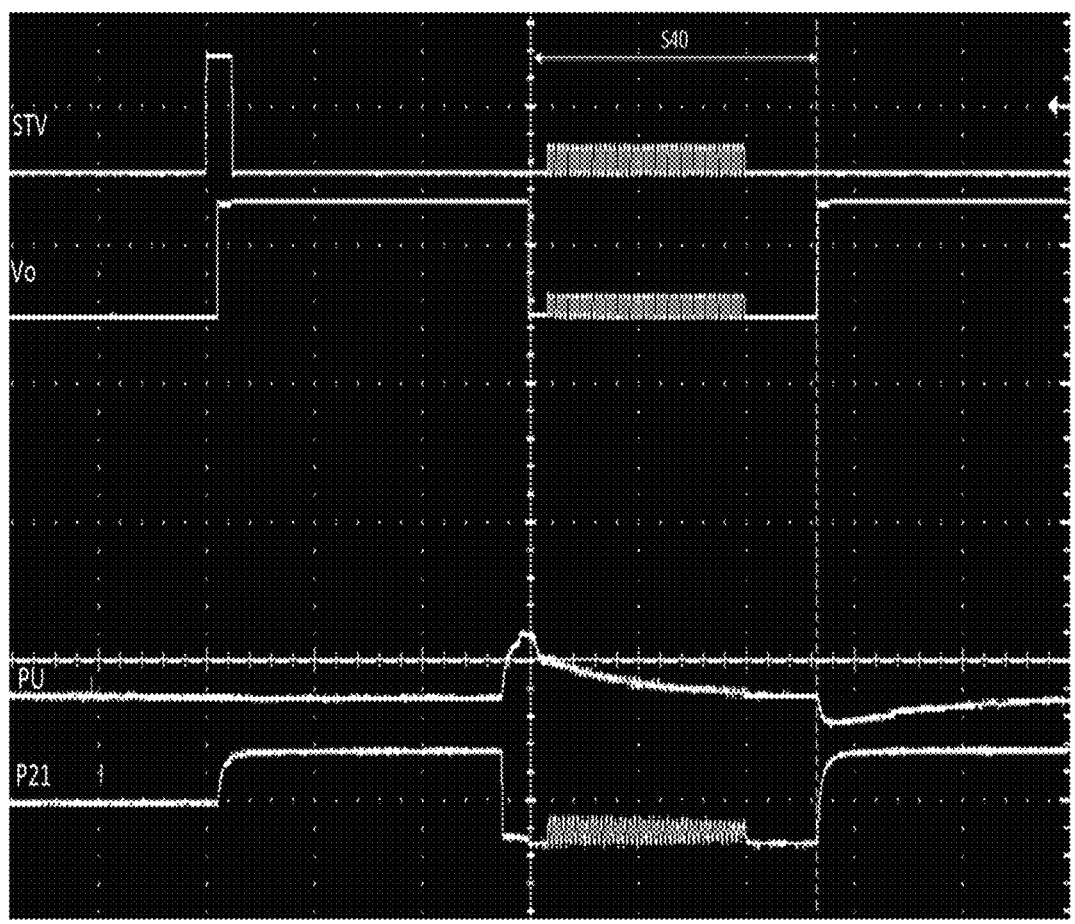
FIG. 4 is a simulation work timing diagram of the gate drive unit shown in FIG. 1 according to at least one embodiment.

FIG. 4 is a simulation work timing diagram of the gate drive unit shown in FIG. 1 according to at least one embodiment. A signal labeled as STV is a frame start signal.

As shown in FIG. 4, the potential of P1 can be maintained at a high voltage during the touch phase S40.

The gate drive unit according to at least one embodiment of the present disclosure includes at least one pull-down circuit; the pull-down circuit is coupled with a pull-up node and a pull-down voltage terminal, and is configured to control connection or disconnection between the pull-up node and the pull-down voltage terminal; one frame of image display time includes display phases and touch phases that are alternately set, and at least one of the touch phases is set between two adjacent display phases. The pull-down circuit is configured to control the disconnection between the pull-up node and the pull-down voltage terminal during the touch phase.

The gate drive unit according to at least one embodiment of the present disclosure controls a path between the pull-up node and the pull-down voltage terminal to be disconnected during the touch phase through the pull-down circuit, so that when the display touch device operates in the touch phase, a potential of the pull-up node may not be pulled down due to leakage, and the potential of the pull-up node may be maintained well. Thus, during a display phase after the touch phase, an output transistor controlled by the pull-up node (a first electrode of the output transistor is electrically coupled with a clock signal output terminal, and a second electrode of the output transistor is electrically coupled with a gate drive signal output terminal) may be correctly turned on. Since the output transistor can be controlled to be correctly turned on during the display phase, the screen flashing phenomenon is improved.

The display touch device according to at least one embodiment of the present disclosure includes a gate drive circuit, and the gate drive circuit includes multiple stages of the above-mentioned gate drive units.

Optionally, the gate drive unit may include a pull-down control circuit, a pull-down node, a pull-down circuit, and a voltage control terminal; the display control device may also include a signal supply unit.

The pull-down circuit includes a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal.

The pull-down control circuit is electrically coupled with the voltage control terminal, the pull-up node, and the pull-down node, and is configured to control a potential of the pull-down node based on a voltage control signal provided at the voltage control terminal and a potential of the pull-up node.

The signal supply unit is configured to control a potential of the voltage control signal to an ineffective voltage during the touch phase, so that the pull-down control circuit controls the potential of the pull-down node, and the pull-down transistor is controlled to be turned off.

Figure 5:
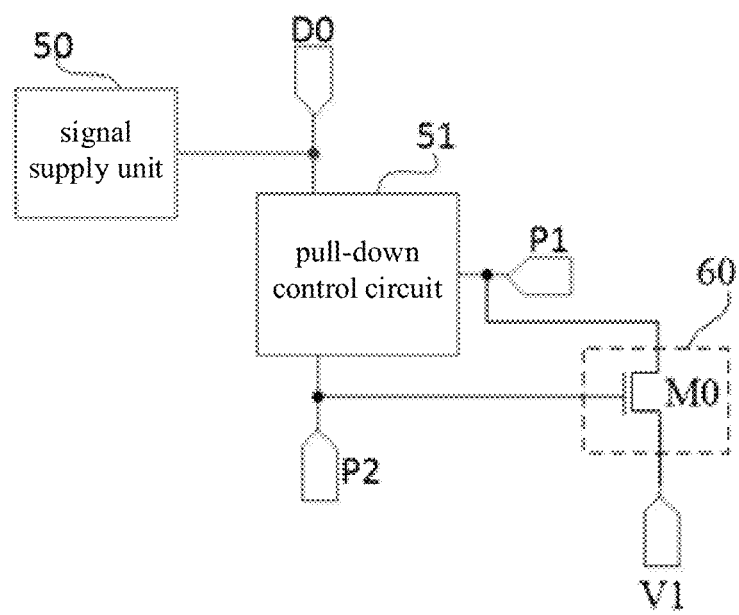
FIG. 5 is a schematic structural diagram of a display touch device according to at least one embodiment of the present disclosure.

The display touch device according to at least one embodiment of the present disclosure includes a gate drive circuit and a signal supply unit 50; the gate drive circuit includes a multi-level gate drive unit;

As shown in FIG. 5, the gate drive unit includes a pull-down control circuit 51, a voltage control terminal D0, a pull-down node P2, and a pull-down circuit 60.

The pull-down control circuit 51 is electrically coupled with the voltage control terminal D0, the pull-down node P2, and the pull-up node P1, and is configured to control the potential of the pull-down node P2 under the control of the voltage control signal provided at the voltage control terminal D0 and potential of the pull-up node P1.

The pull-down circuit 60 includes a pull-down transistor M0; a gate electrode of the pull-down transistor M0 is electrically coupled with the pull-down node P2, a drain electrode of the pull-down transistor M0 is electrically coupled with the pull-up node P1, and a source electrode of the pull-down transistor M0 is electrically coupled with a first low-voltage terminal; and the first low-voltage terminal is used to provide a first low voltage V1.

The signal supply unit 50 is electrically coupled with the voltage control terminal D0, and is configured to control the voltage control signal supplied to the voltage control terminal D0 to be an effective voltage signal when the display touch device is working in the display phase, and to control the voltage control signal supplied to the voltage control terminal D0 to be an ineffective voltage signal when the display touch device is working in the touch phase.

In at least one embodiment of the present disclosure, the potential of the effective voltage signal is an effective voltage, and the potential of the ineffective voltage signal is an ineffective voltage.

In at least one embodiment shown in FIG. 5, the pull-down voltage terminal is the first low-voltage terminal, but it is not limited to this.

In at least one embodiment shown in FIG. 5, M0 is an NMOS transistor (N-type metal-oxide-semiconductor transistor), but it is not limited to this.

In specific implementation, the pull-down control circuit may include a first pull-down control transistor and a second pull-down control transistor.

Both a control electrode and a first electrode of the first pull-down control transistor are electrically coupled with the voltage control terminal, and a second electrode of the first pull-down control transistor is electrically coupled with the pull-down node.

A control electrode of the second pull-down control transistor is electrically coupled with the pull-up node, a first electrode of the second pull-down control transistor is electrically coupled with the pull-down node, and a second electrode of the second pull-down control transistor is electrically coupled with the first low-voltage terminal.

In at least one embodiment of the present disclosure, in a case that the first pull-down control transistor is an n-type transistor, the effective voltage signal is a high voltage signal, and the ineffective voltage signal is a low voltage signal; in a case that the first pull-down control transistor is a p-type transistor, the effective voltage signal is a low voltage signal, and the ineffective voltage signal is a high voltage signal; which are not limited thereto.

Optionally, the gate drive unit includes a first pull-down node, a second pull-down node, a first pull-down circuit, and a second pull-down circuit; the first pull-down circuit includes a first pull-down transistor, and the second pull-down circuit includes a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal.

The gate drive unit further includes a first voltage control terminal, a second voltage control terminal, and a pull-down control circuit. The pull-down control circuit is electrically coupled with the first voltage control terminal, the second voltage control terminal, the pull-up node, the first pull-down node, and the second pull-down node, and is configured to control the potential of the first pull-down node based on a first voltage control signal provided by the first voltage control terminal and the potential of the pull-up node, and to control the potential of the second pull-down node based on a second voltage control signal provided by the second voltage control terminal and the potential of the pull-up node.

The signal supply unit is configured to control the potential of the first voltage control signal supplied to the first voltage control terminal to be an ineffective voltage during the touch control phase, so that the pull-down control circuit controls the potential of the first pull-down node, thereby controlling the first pull-down transistor to be turned off. The signal supply unit is also configured to control the potential of the second voltage control signal supplied to the second voltage control terminal to be an ineffective voltage during the touch phase, so that the pull-down control circuit controls the potential of the second pull-down node, thereby controlling the second pull-down transistor to be turned off.

The display touch device according to at least one embodiment of the present disclosure includes a gate drive circuit and a signal supply unit 50, and the gate drive circuit includes multiple stages of gate drive units.

Figure 6:
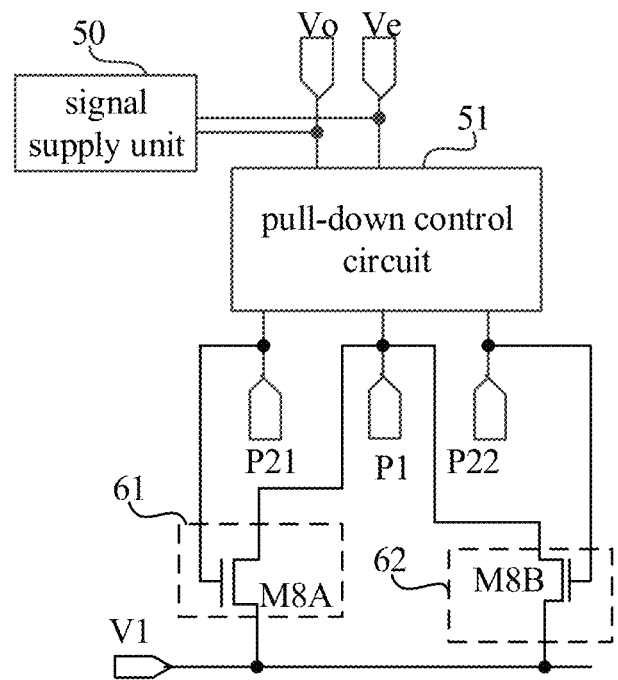
FIG. 6 is a schematic structural diagram of a display touch device according to at least one embodiment of the present disclosure.

As shown in FIG. 6, the gate drive unit includes a pull-down control circuit 51, a first voltage control terminal Vo, a second voltage control terminal Ve, a first pull-down node P21, a second pull-down node P22, a first pull-down circuit 61 and a second pull-down circuit 62. An operating cycle of the display touch device includes a plurality of switching periods, and the switching period includes a first switching time period and a second switching time period.

The pull-down control circuit 51 is electrically coupled with the first voltage control terminal Vo, the second voltage control terminal Ve, the first pull-down node P21, the second pull-down node P22, and the pull-up node P1, and is configured to control a potential of the first pull-down node P21 under the control of the first voltage control signal provided by the first voltage control terminal Vo and the potential of the pull-up node P1, and to control a potential of the second pull-down node P22 under the control of the second voltage control signal provided at the voltage control terminal Ve and the potential of the pull-up node P1.

The signal supply unit 50 is electrically coupled with the first voltage control terminal Ve and the second voltage control terminal Vo. The signal supply unit 50 is configured to control the first voltage control signal provided by the first voltage control terminal Vo to be an effective voltage signal, when the display touch device operates in the display phase during the first switching time period, is configured to control the second voltage control signal provided by the voltage terminal Ve to be an effective voltage signal, when the display touch device operates in the display phase during the second switching time period, and is configured to control both the first voltage control signal and the second voltage control signal to be an ineffective voltage signal, when the display touch device operates in the touch phase.

The first pull-down circuit 61 includes a first pull-down transistor M8A, and the second pull-down node 62 includes a second pull-down transistor M8B.

A gate electrode of M8A is electrically coupled with the first pull-down node P21, a drain electrode of M8A is electrically coupled with the pull-up node P1, and a source electrode of M8A is electrically coupled with the first low-voltage terminal.

A gate electrode of M8B is electrically coupled with the second pull-down node P22, a drain electrode of M8B is electrically coupled with the pull-up node P1, and a source electrode of M8B is electrically coupled with the first low-voltage terminal. The first low-voltage terminal is used to provide a first low voltage V1.

In at least one embodiment shown in FIG. 6, the pull-down voltage terminal is the first low-voltage terminal, but it is not limited to this.

In at least one embodiment shown in FIG. 6, both M8A and M8B are NMOS transistors, but not limited thereto.

Optionally, an operating cycle of the display touch device includes a plurality of switching periods, and the switching period includes a first switching time period and a second switching time period. The signal supply unit is further configured to: control a potential of the first voltage control signal to be an effective voltage and a potential of the second voltage control signal to be an ineffective voltage, when the display touch device is operating in the display phase during the first switching time period, and control the potential of the second voltage control signal to be an effective voltage and the potential of the first voltage control signal to be an ineffective voltage, when the display touch device is operating in the display phase during the second switching time period.

In at least one embodiment of the present disclosure, the gate drive unit may include two voltage control terminals: a first voltage control terminal and a second voltage control terminal, and the switching period includes a first switching time period and a second switching time period. The gate drive unit is provided with a first pull-down node and a second pull-down node. In the display phase during the first switching time period, the potential of the first voltage control signal is an effective voltage, and in the display phase during the second switching time period, the potential of the second voltage control signal is an effective voltage. According to at least one embodiment of the present disclosure, the first voltage control signal and the second voltage control signal are used, and the first voltage control signal and the second voltage control signal are designed to be effective in different times or divided times, so that the potential of the pull-down node and the potential of the second pull-down node can be made time-sharing effective.

In specific implementation, the pull-down control circuit may include a first pull-down control transistor, a second pull-down control transistor, a third pull-down control transistor, and a fourth pull-down control transistor.

A control electrode of the first pull-down control transistor and a first electrode of the first pull-down control transistor are both electrically coupled with the first voltage control terminal, and a second electrode of the first pull-down control transistor is electrically coupled with the first pull-down node.

A control electrode of the second pull-down control transistor is electrically coupled with the pull-up node, a first electrode of the second pull-down control transistor is electrically coupled with the first pull-down node, and a second electrode of the second pull-down control transistor is electrically coupled with the first low-voltage terminal.

A control electrode of the third pull-down control transistor and a first electrode of the third pull-down control transistor are electrically coupled with the second voltage control terminal, and a second electrode of the third pull-down control transistor is electrically coupled with the second pull-down node.

A control electrode of the fourth pull-down control transistor is electrically coupled with the pull-up node, a first electrode of the fourth pull-down control transistor is electrically coupled with the second pull-down node, and a second electrode of the fourth pull-down control transistor is electrically coupled with the first low-voltage terminal.

Figure 7:
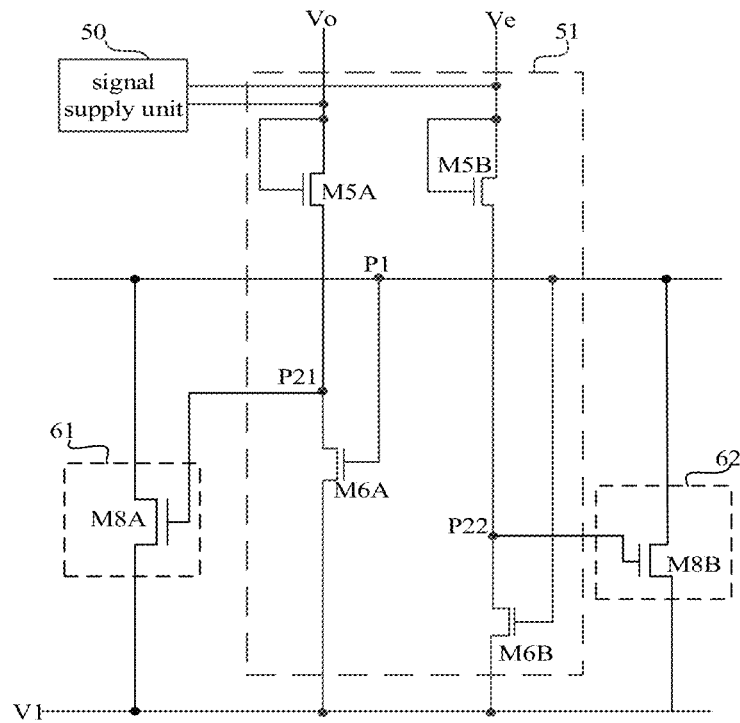
FIG. 7 is a circuit diagram of a display touch device according to at least one embodiment of the present disclosure.

As shown in FIG. 7, on the basis of the at least one embodiment shown in FIG. 6, the pull-down control circuit 51 includes a first pull-down control transistor M5A, a second pull-down control transistor M5B, a third pull-down control transistor M6A, and a fourth pull-down control transistor M6B.

A gate electrode of the first pull-down control transistor M5A and the drain electrode of the first pull-down control transistor M5A are electrically coupled with the first voltage control terminal Vo, and the source electrode of the first pull-down control transistor M5A Electrically coupled with the first pull-down node P21.

A gate electrode of the second pull-down control transistor M6A is electrically coupled with the pull-up node P1, a drain electrode of the second pull-down control transistor M6A is electrically coupled with the first pull-down node P21, and a source electrode of the second pull-down control transistor M6A is electrically coupled with the first low-voltage terminal; the first low-voltage terminal is used to provide a first low voltage V1.

A gate electrode of the third pull-down control transistor M5B and a drain electrode of the third pull-down control transistor M5B are both electrically coupled with the second voltage control terminal Ve, and a source electrode of the third pull-down control transistor M5B is electrically coupled with the second pull-down node P22.

A gate electrode of the fourth pull-down control transistor M6B is electrically coupled with the pull-up node P1, a drain electrode of the fourth pull-down control transistor M6B is electrically coupled with the second pull-down node P22, and a source electrode of the fourth pull-down control transistor M6B is electrically coupled with the first low-voltage terminal.

In at least one embodiment shown in FIG. 7, each of M5A, M5B, M6A, and M6B is an NMOS transistor, the effective voltage signal thereof is a high voltage signal, and the ineffective voltage signal thereof is a low voltage signal, which are not limited thereto.

In at least one embodiment of the present disclosure, when each of the pull-down control transistors is a p-type transistor, the effective voltage signal is a low voltage signal, and the ineffective voltage signal is a high voltage signal, but it is not limited to this.

Figure 8:
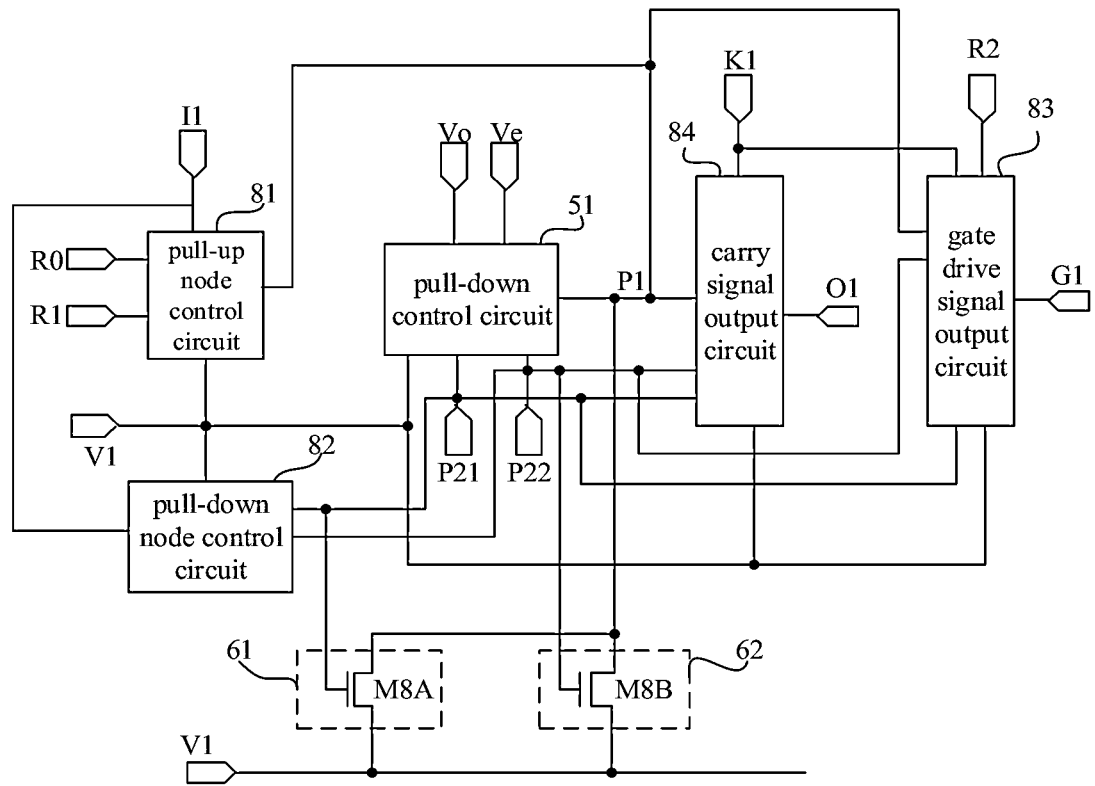
FIG. 8 is a structural diagram of a gate drive unit according to at least one embodiment of the present disclosure.

As shown in FIG. 8, based on the at least one embodiment of the gate drive unit shown in FIG. 6, the gate drive unit according to at least one embodiment of the present disclosure may further include: a pull-up node control circuit 81, a pull-down node control circuit 82, a gate drive signal output circuit 83, and a carry signal output circuit 84.

The pull-up node control circuit 81 is electrically coupled with the first reset terminal R1, the frame reset terminal R0, the input terminal I1, the pull-up node P1, and the first low-voltage terminal, and is configured to: control a path between the pull-up node P1 and the input terminal I1 to be connected or disconnected under the control of an input signal provided at the input terminal I1, and control a path between the pull-up node P1 and the first low-voltage terminal to be connected or disconnected under the control of a reset signal provided at the first reset terminal R1. The pull-down node control circuit 82 is electrically coupled with the input terminal I1, the first pull-down node P21, the second pull-down node P22, and the first low-voltage terminal, and is configured, under the control of the input signal provided at the input terminal I1, to: control a path between the first pull-down node P21 and the first low-voltage terminal to be connected or disconnected, and control a path between the second pull-down node P22 and the first low-voltage terminal to be connected or disconnected.

The carry signal output circuit 84 is electrically coupled with the pull-up node P1, the first pull-down node P21, the second pull-down node P22, the clock signal output terminal k1, the carry signal output terminal O1, and the first low-voltage terminal. The carry signal output circuit 84 is configured to: control a path between the carry signal output terminal O1 and the clock signal output terminal K1 to be connected or disconnected under the control of the potential of the pull-up node P1, control a path between the carry signal output terminal O1 and the first low-voltage terminal to be connected or disconnected under the control of the potential of the first pull-down node P21, and control a path between the carry signal output terminal O1 and the first low-voltage terminal to be connected or disconnected under the control of the potential of the second pull-down node P22.

The gate drive signal output circuit 83 is coupled with the pull-up node P1, the first pull-down node P21, the second pull-down node P22, the second reset terminal R2, the clock signal output terminal K1, the gate drive signal output terminal G1, and the second low-voltage terminal. The gate drive signal output circuit 83 is configured to: control a path between the gate drive signal output terminal G1 and the clock signal output terminal K1 to be connected or disconnected under the control of the potential of the pull-up node P1, control a path between the gate drive signal output terminal G1 and the clock signal output terminal K to be connected or disconnected under the control of the potential of the first pull-down node P21, control a path between the gate drive signal output terminal G1 and the clock signal output terminal K to be connected or disconnected under the control of the potential of the second pull-down node P22, and control a path between the gate drive signal output terminal G1 and the clock signal output terminal K to be connected or disconnected under the control of the potential of the second reset terminal R2. The second reset terminal R2 is used to provide a second low voltage V2.

In at least one embodiment shown in FIG. 8, the carry signal output terminal O1 is used for cascade connection between a row of gate drive unit and a next row of gate drive unit that are adjacent, the input terminal I1 may be electrically coupled with a carry signal output terminal of a pervious row of gate drive unit adjacent to this row of gate drive unit. The first reset terminal R1 may be electrically coupled with a carry signal output terminal of a next row of gate drive unit adjacent to this row of gate drive unit, and the gate drive signal output terminal G1 is used to provide a gate drive signal to a corresponding row gate line.

Figure 9:
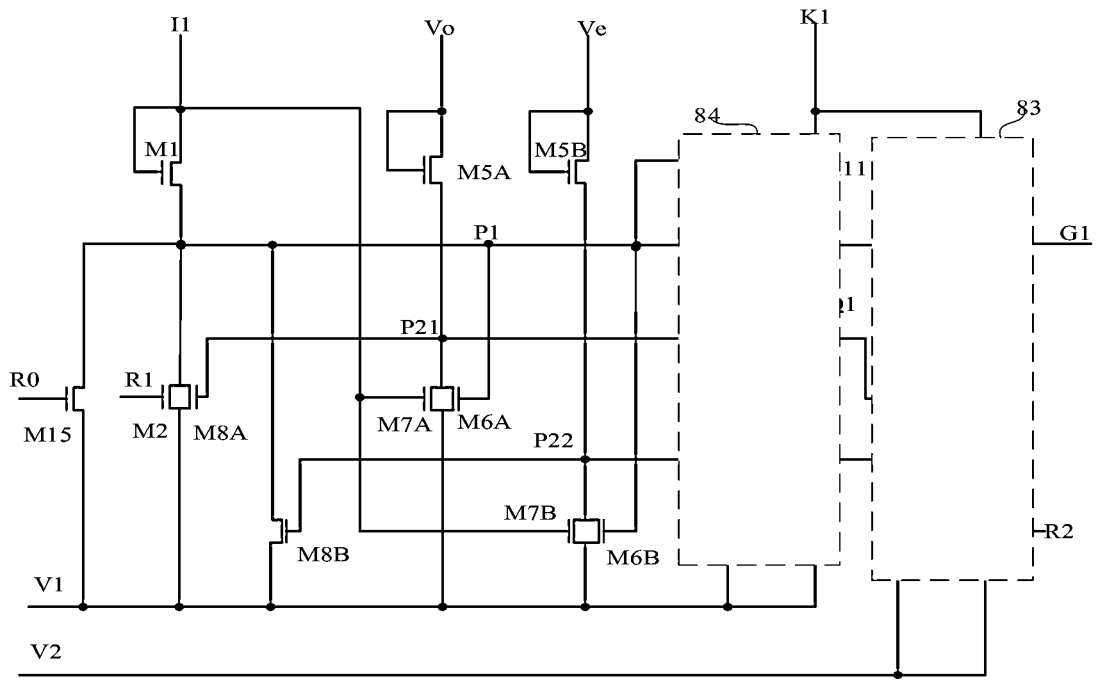
FIG. 9 is a circuit diagram of a gate drive unit according to at least one embodiment of the present disclosure.

As shown in FIG. 9, based on the gate drive unit shown in FIG. 8, the pull-down control circuit includes a first pull-down control transistor M5A, a second pull-down control transistor M5B, a third pull-down control transistor M6A, and a fourth pull-down control transistor M6B.

A gate electrode of the first pull-down control transistor M5A and a drain electrode of the first pull-down control transistor M5A are electrically coupled with the first voltage control terminal Vo, and a source electrode of the first pull-down control transistor M5A is electrically coupled with the first pull-down node P21.

A gate electrode of the second pull-down control transistor M6A is electrically coupled with the pull-up node P1, a drain electrode of the second pull-down control transistor M6A is electrically coupled with the first pull-down node P21, and a source electrode of the second pull-down control transistor M6A is electrically coupled with the first low-voltage terminal. The first low-voltage terminal is used to provide a first low voltage V1.

Agate electrode of the third pull-down control transistor M5B and a drain electrode of the third pull-down control transistor M5B are both electrically coupled with the second voltage control terminal Ve, and a source electrode of the third pull-down control transistor M5B is electrically coupled with the second pull-down node P22.

A gate electrode of the fourth pull-down control transistor M6B is electrically coupled with the pull-up node P1, a drain electrode of the fourth pull-down control transistor M6B is electrically coupled with the second pull-down node P22, and a source electrode of fourth pull-down control transistor M6B is electrically coupled with the first low-voltage terminal.

The pull-down control circuit includes a first pull-down node control transistor M7A and a second pull-down node control transistor M7B.

A gate electrode of M7A is electrically coupled with the input terminal I1, a drain electrode of M7A is electrically coupled with the first pull-down node P21, and a source electrode of M7A is electrically coupled with the first low-voltage terminal.

A gate electrode of M7B is electrically coupled with the input terminal I1, a drain electrode of M7B is electrically coupled with the second pull-down node P22, and a source electrode of M7B is electrically coupled with the first low-voltage terminal.

A pull-up node control circuit includes an input transistor M1, a reset transistor M2, and a frame reset transistor M15; the first pull-down circuit includes a first pull-down transistor M8A, and the second pull-down circuit includes a second pull-down transistor M8B.

Both a gate electrode of M1 and a drain electrode of M1 are electrically coupled with the input terminal I1, and a source electrode of M1 is electrically coupled with the pull-up node P1.

A gate electrode of M2 is electrically coupled with the first reset terminal R1, a drain electrode of M2 is electrically coupled with the pull-up node P1, and a source electrode of M2 is electrically coupled with the first low-voltage terminal.

A gate electrode of M8A is electrically coupled with the first pull-down node P21, a drain electrode of M8A is electrically coupled with the pull-up node P1, and a source electrode of M8A is electrically coupled with the first low-voltage terminal.

A gate electrode of M8B is electrically coupled with the second pull-down node P22, a drain electrode of M8B is electrically coupled with the pull-up node P1, and a source electrode of M8B is electrically coupled with the first low-voltage terminal.

A gate electrode of M15 is electrically coupled with the frame reset terminal R0, a drain electrode of M15 is electrically coupled with the pull-up node P1, and a source electrode of M15 is electrically coupled with the first low-voltage terminal.

The carry signal output circuit 84 includes a first carry output transistor M11, a second carry output transistor M12A, and a third carry output transistor M12B.

The gate drive signal output circuit 83 includes a first gate drive output transistor M3, a second gate drive output transistor M13A, a third gate drive output transistor M13B, a fourth gate drive output transistor M4 and an output capacitor C1.

A gate electrode of M11 is electrically coupled with the pull-up node P1, a drain electrode of M11 is electrically coupled with the clock signal output terminal k1, and a source electrode of M11 is electrically coupled with the carry signal output terminal O1.

A gate electrode of M12A is electrically coupled with the first pull-down node P21, a drain electrode of M12A is electrically coupled with the carry signal output terminal O1, and a source electrode of M12A is electrically coupled with the first low-voltage terminal.

A gate electrode of M12B is electrically coupled with the second pull-down node P22, a drain electrode of M12B is electrically coupled with the carry signal output terminal O1, and a source electrode of M12B is electrically coupled with the first low-voltage terminal.

A gate electrode of M3 is electrically coupled with the pull-up node P1, a drain electrode of M3 is electrically coupled with the clock signal output terminal K1, and a source electrode of M3 is electrically coupled with the gate drive signal output terminal G1.

A gate electrode of M13A is electrically coupled with the first pull-down node P21, a drain electrode of M13A is electrically coupled with the gate drive signal output terminal G1, and a source electrode of M13A is electrically coupled with a second low-voltage terminal, which is used to provide a second low voltage V2.

A gate electrode of M13B is electrically coupled with the second pull-down node P22, a drain electrode of M13B is electrically coupled with the gate drive signal output terminal G1, and a source electrode of M13B is electrically coupled with the second low-voltage terminal.

A gate electrode of M4 is electrically coupled with the second reset terminal R2, a drain electrode of M4 is electrically coupled with the gate drive signal output terminal G1, and a source electrode of M4 is electrically coupled with the second low-voltage terminal.

A first end of C1 is electrically coupled with the pull-up node P1, and a second end of C1 is electrically coupled with the gate drive signal output terminal G1.

In at least one embodiment of the gate drive unit shown in FIG. 9, all the transistors are NMOS transistors, but not limited thereto.

In at least one embodiment of the gate drive unit shown in FIG. 9, the second reset terminal R2 may be electrically coupled with a gate drive signal output terminal of the adjacent next-stage of gate drive unit, but it is not limited to this.

The display touch device provided by at least one embodiment of the present disclosure may be any product or component with a display touch function, such as a mobile phone, a tablet computer, a television, a monitor, a notebook computer, a digital photo frame, a navigator, and the like.

The above embodiments are preferred embodiments of the present disclosure. It should be noted that those of ordinary skill in the art can make several improvements and modifications without departing from the principles described in the present disclosure, and these improvements and modifications shall be regarded as the protection scope of the present disclosure.

What is claimed is:

1. A driving method, applied to a gate drive unit in a display touch device, wherein the gate drive unit comprises at least one pull-down circuit; the at least one pull-down circuit is coupled with a pull-up node and a pull-down voltage terminal, and is configured to control connection or disconnection between the pull-up node and the pull-down voltage terminal; one frame of image display time comprises a display phase and a touch phase that are alternately set, and at least one of the touch phase is set between two adjacent display phases;

and the driving method comprises: during the touch phase, controlling, by the at least one pull-down circuit, the disconnection between the pull-up node and the pull-down voltage terminal, wherein the at least one pull-down circuit is configured to control a duration of the disconnection between the pull-up node and the pull-down voltage terminal to be greater than or equal to a duration of the touch phase.

2. The driving method according to claim 1, wherein the gate drive unit comprises one pull-down node and one pull-down circuit; the pull-down circuit comprises a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal; and the driving method comprises:

controlling, during the touch phase, the pull-down transistor to be turned off by controlling a potential of the pull-down node, wherein a turn-off duration of the pull-down transistor is greater than or equal to a duration of the touch phase.

3. The driving method according to claim 2, wherein the gate drive unit further comprises a voltage control terminal and a pull-down control circuit; the pull-down control circuit is electrically coupled with the voltage control terminal, the pull-up node and the pull-down node, and is configured to control the potential of the pull-down node according to a voltage control signal provided at the voltage control terminal and a potential of the pull-up node; and the driving method comprises:

during the touch phase, controlling a potential of the voltage control signal to be an ineffective voltage, so that the pull-down control circuit controls the potential of the pull-down node, and the pull-down transistor is turned off.

4. The driving method according to claim 3, further comprising:

controlling the potential of the voltage control signal provided at the voltage control terminal to be an effective voltage, when the display touch device operates in the display phase.

5. The driving method according to claim 1, wherein the gate drive unit comprises a first pull-down node, a second pull-down node, a first pull-down circuit, and a second pull-down circuit; the first pull-down circuit comprises a first pull-down transistor, and the second pull-down circuit comprises a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal; and the driving method comprises:

controlling, during the touch phase, the first pull-down transistor and the second pull-down transistor to be turned off by controlling a potential of the first pull-down node and a potential of the second pull-down node, wherein a turned-off duration of the first pull-down transistor is greater than a duration of the touch phase, and a turn-off duration of the second pull-down transistor is greater than or equal to the duration of the touch phase.

6. The driving method according to claim 5, wherein the gate drive unit further comprises a first voltage control terminal, a second voltage control terminal, and a pull-down control circuit; the pull-down control circuit is electrically coupled with the first voltage control terminal, the second voltage control terminal, the pull-up node, the first pull-down node, and the second pull-down node, and is configured to control the potential of the first pull-down node based on a first voltage control signal provided at the first voltage control terminal and the potential of the pull-up node, and to control the potential of the second pull-down node based on a second voltage control signal provided at the second voltage control terminal and the potential of the pull-up node; and the driving method comprises:

during the touch phase, controlling the potential of the first voltage control signal provided at the first voltage control terminal to be an ineffective voltage, and controlling the potential of the first pull-down node by the pull-down control circuit, to enable the pull-down transistor to be turned off; and during the touch phase, controlling the potential of the second voltage control signal provided at the second voltage control terminal to be an ineffective voltage, and controlling the potential of the second pull-down node by the pull-down control circuit, to enable the second pull-down transistor to be turned off.

7. The driving method according to claim 6, wherein an operating cycle of the display touch device comprises a plurality of switching periods, each of the switching periods comprises a first switching time period and a second switching time period, and the driving method further comprises:

when the display touch device operates in the display phase during the first switching time period, controlling the potential of the first voltage control signal to be an effective voltage, and controlling the potential of the second voltage control signal to be an ineffective voltage; and when the display touch device operates in the display phase during the second switching time period, controlling the potential of the second voltage control signal to be an effective voltage, and controlling the potential of the first voltage control signal to be an ineffective voltage.

8. The driving method according to claim 7, wherein each of a duration of the first switching time period and a duration of the second switching time period is one frame of image display time; or, each of a duration of the first switching time period and a duration of the second switching time period is greater than or equal to N frames of image display time, and N is an integer greater than or equal to 1.

9. A gate drive unit, comprising at least one pull-down circuit; wherein the at least one pull-down circuit is coupled with a pull-up node and a pull-down voltage terminal, and is configured to control connection or disconnection between the pull-up node and the pull-down voltage terminal; one frame of image display time comprises a display phase and a touch phase that are alternately set, and at least one of the touch phase is set between two adjacent display phases; and the pull-down circuit is configured to control the disconnection between the pull-up node and the pull-down voltage terminal, wherein the at least one pull-down circuit is configured to control a duration of the disconnection between the pull-up node and the pull-down voltage terminal to be greater than or equal to a duration of the touch phase.

10. A display touch device, comprising a gate drive circuit, wherein the gate drive circuit comprises a plurality of stages of the gate drive units according to claim 9.

11. The display touch device according to claim 10, wherein the gate drive unit comprises a pull-down control circuit, a pull-down node, a pull-down circuit, and a voltage control terminal; the display control device further comprises a signal supply unit;

the pull-down circuit comprises a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal;

the pull-down control circuit is electrically coupled with the voltage control terminal, the pull-up node, and the pull-down node, and is configured to control a potential of the pull-down node according to a voltage control signal provided at the voltage control terminal and a potential of the pull-up node; and the signal supply unit is configured to control a potential of the voltage control signal to an ineffective voltage during the touch phase, so that the pull-down control circuit controls the potential of the pull-down node, and the pull-down transistor is controlled to be turned off.

12. The display touch device according to claim 10, wherein the gate drive unit comprises a first pull-down node, a second pull-down node, a first pull-down circuit, and a second pull-down circuit; the first pull-down circuit comprises a first pull-down transistor, and the second pull-down circuit comprises a second pull-down transistor; a control electrode of the first pull-down transistor is electrically coupled with the first pull-down node, a first electrode of the first pull-down transistor is electrically coupled with the pull-up node, and a second electrode of the first pull-down transistor is electrically coupled with the pull-down voltage terminal; a control electrode of the second pull-down transistor is electrically coupled with the second pull-down node, a first electrode of the second pull-down transistor is electrically coupled with the pull-up node, and a second electrode of the second pull-down transistor is electrically coupled with the pull-down voltage terminal;

the gate drive unit further comprises a first voltage control terminal, a second voltage control terminal, and a pull-down control circuit; the pull-down control circuit is electrically coupled with the first voltage control terminal, the second voltage control terminal, the pull-up node, the first pull-down node, and the second pull-down node, and is configured to control the potential of the first pull-down node based on a first voltage control signal provided at the first voltage control terminal and the potential of the pull-up node, and control the potential of the second pull-down node based on a second voltage control signal provided at the second voltage control terminal and the potential of the pull-up node;

the signal supply unit is configured to:

during the touch phase, control the potential of the first voltage control signal supplied to the first voltage control terminal to be an ineffective voltage, and control the potential of the first pull-down node by the pull-down control circuit, to control the pull-down transistor to be turned off; and during the touch phase, control the potential of the second voltage control signal supplied to the second voltage control terminal to be an ineffective voltage, and control the potential of the second pull-down node by the pull-down control circuit, to control the second pull-down transistor to be turned off.

13. The display touch device according to claim 12, wherein an operating cycle of the display touch device comprises a plurality of switching periods, each of the switching periods comprises a first switching time period and a second switching time period, and the signal supply unit is further configured to:

when the display touch device operates in the display phase during the first switching time period, control the potential of the first voltage control signal to be an effective voltage, and control the potential of the second voltage control signal to be an ineffective voltage; and when the display touch device operates in the display phase during the second switching time period, control the potential of the second voltage control signal to be an effective voltage, and control the potential of the first voltage control signal to be an ineffective voltage.

14. A driving method, applied to a gate drive unit in a display touch device, wherein the gate drive unit comprises at least one pull-down circuit; the at least one pull-down circuit is coupled with a pull-up node and a pull-down voltage terminal, and is configured to control connection or disconnection between the pull-up node and the pull-down voltage terminal; one frame of image display time comprises a display phase and a touch phase that are alternately set, and at least one of the touch phase is set between two adjacent display phases; and the driving method comprises:

during the touch phase, controlling, by the at least one pull-down circuit, the disconnection between the pull-up node and the pull-down voltage terminal, wherein the gate drive unit comprises one pull-down node and one pull-down circuit; the pull-down circuit comprises a pull-down transistor, a control electrode of the pull-down transistor is electrically coupled with the pull-down node, a first electrode of the pull-down transistor is electrically coupled with the pull-up node, and a second electrode of the pull-down transistor is electrically coupled with the pull-down voltage terminal; and controlling, during the touch phase, the pull-down transistor to be turned off by controlling a potential of the pull-down node, wherein a turn-off duration of the pull-down transistor is greater than or equal to a duration of the touch phase.

\* \* \* \* \*